CYLINDRICAL

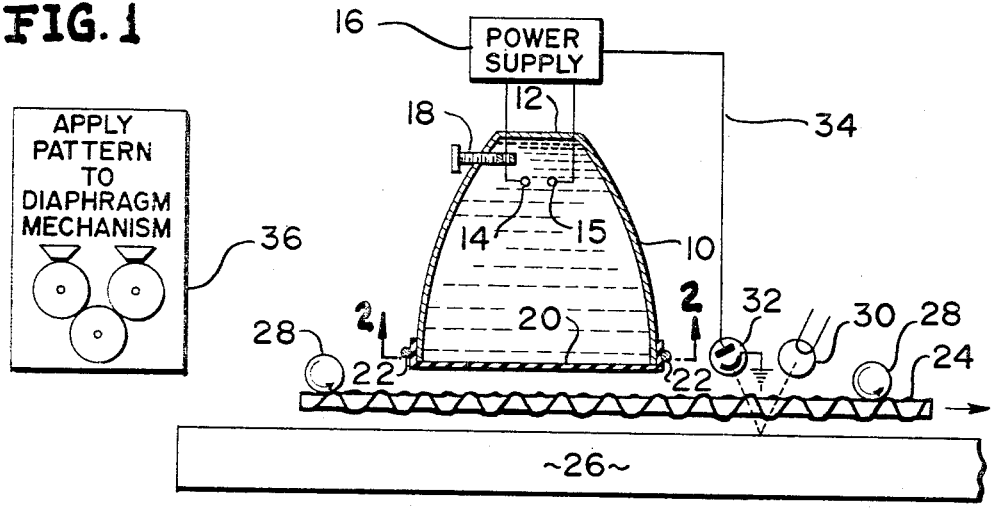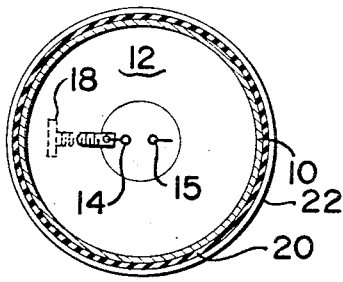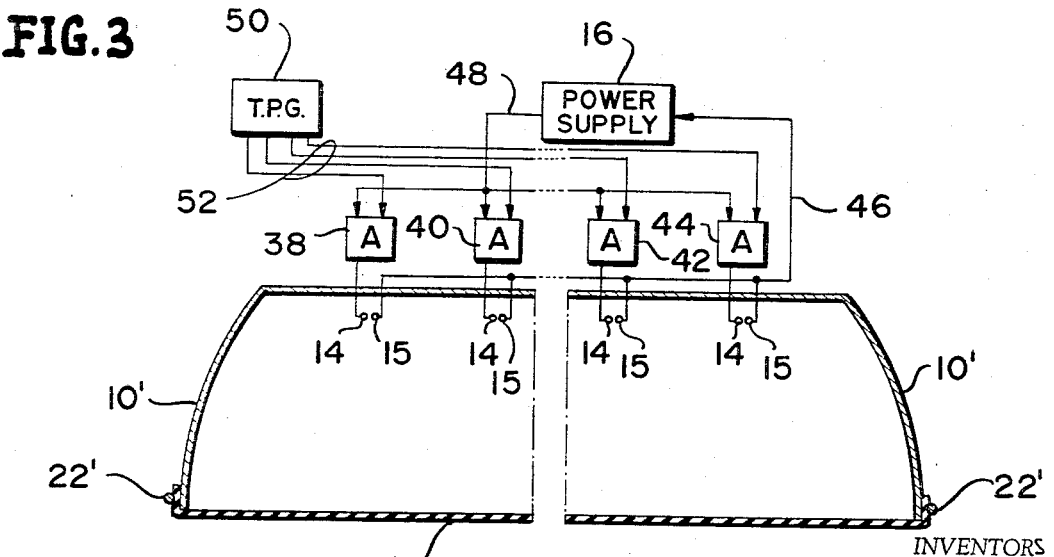

CONICAL

EXPONENTIAL

PARABOLIC

HYPERBOLIC

United States Patent Office 3,408,220
Patented Oct. 29, 1968

3,408,220
METHOD AND APPARATUS FOR ELECTRO-HYDRAULIC PRINTING
Gordon H. Bendix, Orland Park, Donald J. Roth, Chicago Heights, and Paul M. Erlandson, Palos Park, Ill., assignors to Continental Can Company, Inc., New York, N.Y., a corporation of New York
Filed July 7, 1965, Ser. No. 470,073
32 Claims. (Cl. 117—37)

ABSTRACT OF THE DISCLOSURE

Apparatus and method for transferring patterns in the form of printing, coating, decorating, etc. to a substrate through the actuation of a pattern bearing member having an electro-hydraulic discharge. Chambers having different geometric configurations have an open end over which is secured an elastomeric diaphragm. The pattern, printing, etc. is applied to the outer surface of the membrane and the substrate to be acted upon is advanced adjacent the membrane. The electro-hydraulic actuating provisions include the chamber which may be filled with gaseous or liquid fluids and when the transfer of the pattern, printing, etc. from the membrane to the substrate is to be effected, an electrical discharge is caused to occur between a pair of electrodes positioned within the fluid filled chamber and the energy expended drives the membrane outwardly to transfer the printing medium from the membrane to the substrate.

---

This invention relates to an apparatus and method for transferring patterns in the form of printing, coating, decorating, etc. to a substrate through the actuation of a pattern bearing member by an electrohydraulic means.

Many successful methods have been devised for printing, coating, decorating or the like upon substantially flat surfaces. However, the application of patterns of the aforementioned type to uneven surfaces is a continuing problem. Accordingly, this invention proposes to print, coat, or decorate in a legible and successful manner, such uneven surfaces as corrugated material, plastic foams, multi-wrinkled surfaces, or other surfaces of an uneven nature. This invention proposes that these operations be achieved in a rapid and economical manner.

Heretofore, the printing, coating or decorating of uneven surfaces was either very slow and time-consuming (such as the use of stencilling) or if attempted by high speed means, was of such a poor quality that its acceptability in many instances was questionable. If the offset method of printing were employed, the ink would adhere to the raised portions of the substrate and not reach the lower portions or "valleys" of the substrate. As a result, poor legibility is obtained. The aforementioned process exemplifies the problem in achieving successful printing on uneven surfaces. That is, adherence of the ink or paint or other coating material to the raised portions of the substrate and the omission of the printing fluid to the depressed or valley areas.

Accordingly, it is the principal object of the present invention to improve printing, coating and decorating techniques.

It is a further object of the present invention to provide a method and means for applying contrasting material in a legible manner to an uneven surface.

It is a further object of the present invention to provide a device utilizing electrohydraulic means for printing in a legible manner upon an uneven surface.

It is a further object of the present invention to provide a device utilizing electrohydraulic means for coating the entire surface of an uneven surface.

It is a further object of the present invention to provide a device utilizing electrohydraulic means for applying a pattern in a legible manner to an uneven surface.

It is a further object of the present invention to provide a device utilizing electrohydraulic means for applying a pattern to an uneven surface utilizing either a contact or a non-contact method.

It is a still further object of the present invention to utilize the force created by an electrical discharge to propel a pattern bearing member toward a substrate having an uneven surface to transfer the pattern to the substrate.

In a preferred embodiment of the invention, which is herein disclosed, a pattern transfer technique is employed which may be of the contact type or of a non-contact type. That is, the flexible membrane bearing the pattern to be transferred to the desired workpiece may engage the workpiece or may be controlled in such a manner that the pattern bearing membrane avoids contact with the workpiece by a sudden reversal as it approaches the workpiece but before contact. If contact of the workpiece by the pattern bearing membrane is desired, then the contact may be by any desired force and including a violent impact.

In the present invention, the use of the term "pattern" will be understood to include any form of printing, coating, decorating material or any other type of indicia of ink, paint, oil, particles or virtually any liquid or solid which one wishes to transfer to a surface.

In the practice of the present invention, rough or uneven surfaces may be imprinted as readily as smooth surfaces. Since no surface is perfectly smooth, an improvement over most other techniques is accomplished and printing may be performed on surfaces which are too rough or uneven for standard methods. In addition, multiple-color decoration and pattern transfer becomes feasible in a single pass, thus, eliminating the problem of registration and immediate drying necessary in over-printing processes. An acoustical chamber which may be of varying configurations such as cylindrical, conical, exponential, parabolic or hyperbolic supports a pair of electrodes. One end of the chamber, opposite the electrodes, is discontinuous and enclosed by a flexible membrane which may be of rubber, plastic, or even metal. The chamber contains either a non-conductor such as distilled water, insulating oils, etc. or conductors such as salts dissolved in water, mercury, other liquid metals, or suspensions of conductive particles in a liquid. When suitable power is applied across the electrodes, the energy of the electrical discharge is transmitted through the liquid to the flexible membrane, thus, forcing the membrane outwardly. The degree of excursion of the membrane from its normal position may be controlled by the energy applied to the electrodes. Other fluids such as air may be employed in the chamber but with a diminished coupling to the membrane.

The duration of the pulse applied to the electrodes may be chosen within wide limits by choice of the electrode gap characteristics, the voltage, capacitor storage in the power supply, etc. The problem is to match the energy of a pulse generated in a liquid to a membrane in such a way as to provide uniform deflection of the membrane over the widest possible area. Once these characteristics have been chosen the chamber or horn will be selected which transmits this energy most efficiently to the membrane. The pattern to be transferred to a workpiece may be applied to the membrane by any of the mechanical methods employed and known to those in the printing art. Offset rollers may be employed, screen presses, spraying through stencils, or any form of electrostatic deposition may be used.

In another embodiment of the invention, plural sets of electrodes may be employed. In a suitable membrane configuration, the displacement of different points on the membrane may be controlled in time by generating energy pulses at the respective electrodes either simultaneously or in an accurately controlled time sequence such that the arrival time of each pulse at the membrane is predetermined. It is difficult to achieve uniform displacement of energy point on a large area membrane at a simultaneous instant of time. However, by the proper choice of the number of electrodes, the energy can be spread over a large distance. There is no technical problem in discharging 100 spark gap electrodes at a given instant of time by the discharge of 100 capacitors through devices such as silicon controlled rectifiers in such a way that a trigger pulse is simultaneously applied to the controlled electrodes of all of the silicon-controlled rectifiers. This system would reduce the consequences of the failure of a single capacitor or spark gap since the contribution of one spark gap is small in comparison to the contribution of all the remaining spark gaps.

Workpiece detectors may be employed with the invention to detect the arrival of a workpiece and thus initiate the pattern transfer mechanism. Other refinements, features and alternatives will be readily apparent to those skilled in the art.

The invention both as to its organization and method of operation together with further objects and advantages thereof will best be understood by reference to the following specification taken in conjunction with the accompanying drawings, in which:

FIGURE 1 is an elevational view, partly in section, showing the transfer mechanism wherein the chamber houses a single pair of electrodes;

FIGURE 2 is a sectiional view taken along the line 2—2 of the FIGURE 1;

FIGURE 3 is an elevational view and including a block diagram of the electrical circuitry in the embodiment of the invention including a plurality of pairs of electrodes within the chamber;

Figure 5:
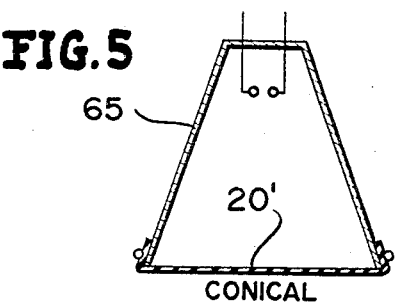
Figure 6:
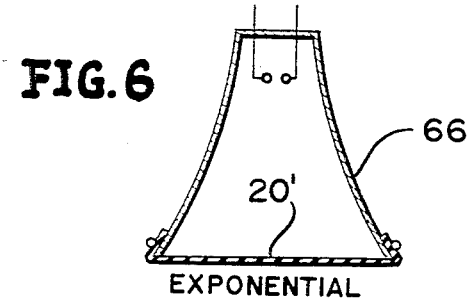
Figure 7:
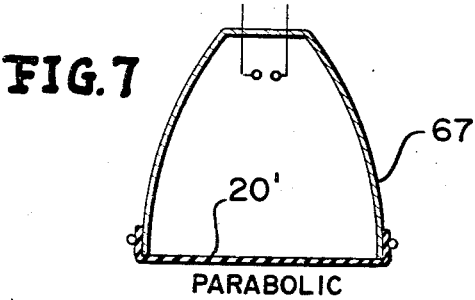
Figure 8:
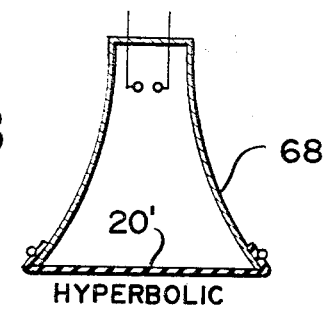

FIGURE 5 discloses a chamber which is conical;

FIGURE 6 shows a chamber which is exponential in configuration;

FIGURE 7 discloses a parabolic chamber;

FIGURE 8 shows a chamber which may be hyperbolic in geometry; and

Figure 9:
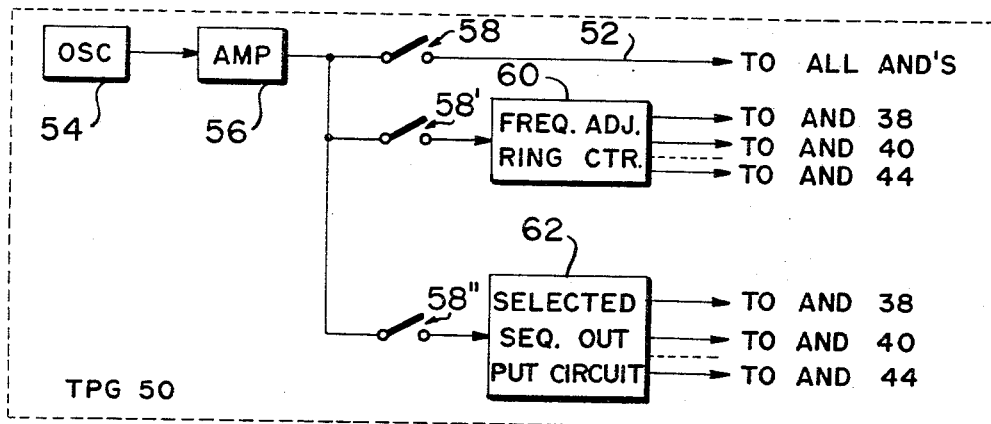

FIGURE 9 is an electrical block diagram of the time pulse generator of the FIGURE 3.

As shown in the FIGURE 1, an acoustical chamber 10 is formed of a rigid material and is opened at one end, the end being substantially opposite that of an area 12 generally identified as the throat area. The chamber 10 may be identified also as a reflector, or a horn. In a usual acoustical chamber, a driver of some type would be positioned at the throat area 12; however, in the present invention, the throat area 12 is continuous and the chamber 10 supports immediately within the throat area 12, a pair of electrodes 14 and 15. The electrodes 14 and 15 are coupled to a suitable source of power 16 by conductors, as shown, which would be insulated from the chamber 10. An adjusting means 18 is provided to vary the gap between the electrodes 14 and 15.

A flexible membrane or diaphragm 20 is positioned over the open end of the chamber 10 and is secured by any suitable manner such as a retaining ring 22. Within the chamber 10 enclosed by the diaphragm 20, a suitable fluid may be housed such as distilled water, insulating oils, salts dissolved in water, mercury, other liquid metals, or suspensions of conductive particles in a liquid. The basic principle of the device is that shock waves created by the electrical energy discharged across the electrodes 14 and 15 causes the diaphragm 20 to be accelerated violently away from the electrodes 14 and 15 in such a manner that any materials held in any way by the diaphragm (by gravity, electrostatic attraction, adhesion, etc.) will be propelled away from the diaphragm 20 and when the diaphragm 20 reaches its maximum displacement, the particles or droplets will be separated from the diaphragm 20 and hurled at a high velocity. A substrate such as corrugated box material, plastic foam material, multi-wrinkled surfaces, sheets of paper, metal surfaces either flat, circular or embossed, may be positioned to intercept the particles or droplets as they are separated from the diaphragm 20.

With continued reference to the FIGURE 1, a substrate 24 of a kind just mentioned, is positioned below the flexible membrane 20 and between a base member 26. The base member 26 acts as a back-up plate during the pattern transfer process. Suitable propelling means 28 may be employed to advance the substrate 24 at any desired velocity. A light source 30 is positioned to reflect its rays from the base member 26 to a photoelectric cell 32 positioned above the substrate 24. The presence of a substrate 24 is detected by the light source 30 and the photoelectric cell 32 since the presence of a substrate 24, will cut off the light path from the light source 30 to the photoelectric cell 32 and thus serve as an indication that matter to be printed, coated, decorated, etc. (a substrate 24) is available. A conductor 34 is coupled between the photoelectric cell 32 and the power supply 16 so that the output from the photoelectric cell 32 may serve as a triggering device, perhaps after a suitable delay, for the power supply 16 to apply energy across the electrodes 14 and 15.

The pattern to be transferred to the diaphragm 20 of the FIGURE 1, may be applied to the diaphragm 20 in any suitable manner. Offset rollers may be employed as well as screen presses, spraying through stencils, or any form of electrostatic deposition. There is represented adjacent the chamber 10, a transfer to diaphragm mechanism 36 which may be oscillated or positioned in any manner to apply the suitable pattern to the diaphragm 20. Either the mechanism 36 may be oscillated, or the chamber 10 may be rotated, or a combination of movements of both the chamber 10 and the mechanism 36 may be employed to achieve the application of the desired pattern to the diaphragm 20. The diaphragm 20 is substantially a smooth surface so that no problem is encountered in applying the desired pattern to the diaphragm 20.

The FIGURE 2 is a sectional view taken along the line 2—2 of the FIGURE 1. In the FIGURE 2, the chamber 10 is shown to be of circular cross-section. However, it will be readily clear that the cross-sectional area of the chamber 10 may be square, rectangular, elliptical, etc. or of any other geometric configuration to meet the demands of pattern transfer that are desired. In the FIGURE 2, the outside ring is the retaining ring 22 which is utilized to secure the membrane 20 to the chamber 10. In a central position and directly below what would be the throat area 12, are the electrodes 14 and 15. The adjusting means 18 is shown which is utilized to vary the distance between the electrodes 14 and 15 and thus vary the effectiveness of the electrical discharge between the electrodes.

An embodiment is shown in the FIGURE 3 wherein a plurality of electrodes 14 and 15 are positioned within an elongated chamber or reflector 10'. In a manner similar to the chamber 10 of the FIGURE 1, the chamber 10' of the FIGURE 3 is enclosed by a flexible membrane or diaphragm 20' and secured in place to the chamber 10' by a retaining ring 22'. Any number of electrode pairs 14 and 15 may be employed in the practice of the invention. In a suitable diaphragm 20' configuration, the displacement of different points on the diaphragm 20' may be controlled in time by generating energy pulses at the respective electrodes 14 and 15 either simultaneously or in any sequence that is desirable such that the arrival time of each pulse across the electrodes 14 and 15 is predetermined. Accordingly, the difficulty of achieving uniform displacement of every point on a large area such as the diaphragm 20', at the same instant of time, is overcome. However, by the proper choice of the number of electrode pairs, which may be very large, energy can be spread over a large distance. It is conceivable, that a discharge may be caused to cross the electrode pairs 14 and 15 in such a sequence to achieve "printing on the fly" at very high speeds.

As shown in the FIGURE 3, selectivity of electrodes 14 and 15 is achieved by a plurality of AND gates or circuits 38, 40, 42 and 44 which have their output coupled to one of the electrodes of each pair such as the electrode 14. The term "AND" when applied to gates or circuits is commonly understood to refer to circuits of the type having a plurality of input terminals and at least one output terminal, an output appearing upon the output terminal upon the application of an input to all of the input terminals. See General Electric Transistor Manual, Fourth Edition, pp. 128 and 129, 1959, General Electric Company, Liverpool, New York or any other text or publication showing "logic" circuits. The other electrode 15 of each of the pairs is connected via a conductor 46 to the power supply 16. The power supply 16 would be of sufficient size to provide the necessary electrical energy across the electrodes 14 and 15 to actuate the diaphragm 20 in the desired manner. The output of the power supply 16 is connected to one of the inputs of each of the AND circuits 38, 40, 42 and 44 by a conductor 48, as shown. A time pulse generator (TPG) 50 has a group of conductors 52 which are directed to the gates 38, 40, 42 and 44, one conductor 52 per gate. In this manner, the time pulse generator 50 can select the pair of electrodes 14 and 15 by pulsing or strobing the electrodes associated gate.

The time pulse generator 50 may be of a type well known in the art, such as that shown in the FIGURE 9. A conventional oscillator 54 applies signals of the desired frequency to an amplifier 56. The amplifier 56 will supply pulses to the AND's 38, 40, 42 and 44 in at least three different modes; in a first mode wherein all electrode pairs are fired simultaneously; in a second mode where the electrode pairs are fired sequentially; and in a third mode where selected electrode pairs may be fired or caused to be discharged in any desired sequence. In the first mode, a switch 58 from the amplifier 56 may be closed which supplies the necessary energy to all of the electrode pairs 14 and 15 by pulsing the AND's 38, 40, 42 and 44. It will be understood that the power supply 16 has previously conditioned all of the AND gates via the conductor 48 and upon application of a pulse through the closed switch 58 via the conductors 52, a discharge will occur between all of the electrode pairs 14 and 15. It will be understood that the switch 58 may be closed either manually, periodically, or by any suitable automatic means such as the photoelectric cell arrangement 32 shown in the FIGURE 1.

In the second mode, energy may be supplied sequentially to the electrode pairs 14 and 15 by a frequency adjustable ring counter 60 of the FIGURE 9 which is coupled from the amplifier 56 through a switch 58'. The ring counter 60 is of a type well known in the art and which sequentially steps from output conductor to output conductor until it returns to its original or first state. As a ring counter 60 steps and at a frequency which is desired according to the requirements of the pattern transfer to be accomplished, pulses will be subsequentially supplied to the AND 38, the AND 40, to any AND circuits which may be positioned within the broken lines, the AND 42 and finally the AND 44. As a result, a sequential spark discharge is caused across the electrodes from left to right as shown in the FIGURE 3. It will be readily understood that the ring counter 60 may also supply pulses to the AND circuits starting with the AND 44 and progressing to the AND 42, and AND 40 and the AND 38.

In a third mode, a selected sequence output circuit 62 is coupled to the amplifier 56 through a switch 58". The selected sequence output circuit 62 may be of a type well known in the art which will supply control pulses upon its output conductors in any selected sequence. The sequence may be selected manually by depressing keys or by automatic selection means. For example, pulses may be applied to the AND's 38, 44, 40 and 42 in that sequence or in any other sequence found desirable. It will be intuitively clear that the portion of the flexible diaphragm 20' in the area below the respective electrodes 14 and 15, would be displaced a maximum distance while adjacent portions of the diaphragm 20' would be displaced by lesser amounts.

Figure 4:
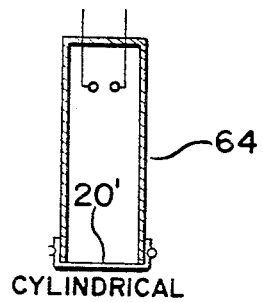
FIGURE 4 shows an embodiment of the configuration of the chamber which is cylindrical.

The chamber 10 of the FIGURE 1 and the chamber 10' of the FIGURE 3, may take the form of known geometrical shapes such as that shown in the FIGURES 4 and 8. Many factors may be varied and by the proper selection of the number of electrodes, shape of the chamber, the size, thickness and characteristics of the diaphragm, and the distance of the diaphragm from the electrodes, which are only a few of the many variables, the greatest efficiency may be achieved. In addition, the configuration of the pattern to be transferred may favor one configuration of a chamber over another. As shown in the FIGURE 4, a cylindrical chamber, horn or reflector 64 is disclosed. A diaphragm 20', the 20' being used to indicate any modification of the diaphragm 20 of the FIGURE 1, encloses the chamber 64.

Similarly, a conical chamber 65 is shown in the FIGURE 5; a chamber 66 which is fashioned after an exponential curve is shown in the FIGURE 6; a chamber 67 of the FIGURE 7 follows a parabolic curve; and, a hyperbolic chamber 68 is shown in the FIGURE 8. It will be understood that each of the chambers 64, 65, 66, 67 and 68 may be filled with any suitable fluid such as air or a liquid. In general, greater coupling between the electrical discharge and the flexible diaphragm is achieved by a more dense material within the chamber.

Thus, there has been described a high energy rate decorating device which involves the application of short duration, high energy pulses in a fluid chamber to actuate a flexible diaphragm to effect non-contact and/or contact printing, decorating, coating, etc., all of which are termed pattern transfer. The pattern to be transferred is applied to the flexible membrane in any suitable known manner. As shown in the FIGURE 1, a substrate 24 such as corrugated material, a foam surface, a multi-wrinkled surface, etc. or even a very smooth surface may be transported into position under the flexible diaphragm 20 and above the base member 26 by the propelling means 28. As soon as the substrate 24 breaks the reflected light path from the light source 30 to the photoelectric cell 32, the photoelectric cell 32 will signal the presence of a substrate 24 to the power supply 16 via the conductor 34. It will be understood that the apply pattern to diaphragm mechanism 36 has already applied the pattern in the form of printing, coating, decorative material, etc. to the diaphragm 20.

After a suitable delay of the signal from the photoelectric cell 32 in the power supply 16, and when the area on the substrate 24 is immediately below the diaphragm 20, then the power supply 16 will apply suitable energy to cause an electrical discharge to take place across the electrodes 14 and 15. The energy from the electrical discharge will be transmitted to the diaphragm 20 in such a manner as to abruptly force the diaphragm 20 downwardly as would be the case shown in the FIGURE 1. As a result, the pattern material on the diaphragm 20 would be removed from the diaphragm 20 upon reversal of the diaphragm 20 as it starts to assume its home position after its excursion due to the electrical discharge. The time rate of change of acceleration of the diaphragm 20 may be maximized by the selection of the material for the diaphragm 20 or by other means such as the application of a vacuum to the chamber immediately after the explosive discharge. Literally thousands of varieties of synthetic and natural rubber have been compounded and along with various flexible metals, plastics, etc., experimentation will result in the selection of a diaphragm having characteristics most conducive to the efficient transfer of the pattern from the membrane to the workpiece or substrate. In regard to the energy supplied by the power supply 16, many factors must be considered such as the fluid in the chamber, the acceleration of the membrane 20 that is desired, the size of the object to be printed, etc. One may wish to store from 100 to 1000 joules in a large capacitor for application to the electrodes. Greater or lesser amounts may be stored and applied to the electrodes as found expedient.

A multi-electrodes system is shown in the FIGURE 3. The AND's 38, 40, 42 and 44 may be silicon-controlled rectifiers and the gate of the silicon-controlled rectifier would be coupled to the time pulse generator 50. Thus, upon actuation of the gate of a respective silicon-controlled rectifier, the power supply 16 would supply, via the conductor 48, sufficient energy to cause an electrical discharge between the respective electrodes coupled thereto. The electrodes may be discharged simutaneously, sequentially, or in any selected sequence as previously discussed with reference to the FIGURE 9.

The basic principle of the invention as herein shown and described, is that the shock waves created by the electrical discharge between the pairs of electrodes cause the membrane or diaphragm coupled to the chamber to be accelerated violently toward a substrate such that any materials held in any way against the diaphragm by gravity, electrostatic attraction, adhesion, etc., will be propelled toward the substrate and when the membrane or diaphragm reaches its maximum displacement, the particles or droplets will be separated from the diaphragm and hurled against the substrate at high velocity. They may be caused to adhere to the substrate by their kinetic energy, may be "boosted" by electrostatic fields, or may be fixed to the surface by heating (fusion) or other well known methods. If adhesion between the diaphragm and the material of the pattern being applied is sufficiently low, the diaphragm may be allowed to impact or strike the substrate. This method would be by contact transfer of the pattern. The amount and time of contact could be controlled by the electrical energy supplied to the electrodes. For non-contact transfer, the diaphragm is driven to a high velocity, and then decelerated abruptly, such that the adhesive bond between the material of the pattern and the diaphragm is overcome and part or all of the material of the pattern continues toward and becomes attached to the workpiece. Accordingly, no contact of the diaphragm and the substrate to be patterned occurs. At least two primary benefits are realized from non-contact pattern transfer in that rough surfaces may be imprinted as readily as smooth surfaces. In addition, multiple-color decoration becomes feasible in a single "pass," thus eliminating the problem of registration and intermediate drying necessary in an over-printing process.

The high energy process herein described may be applied to virtually any liquid or solid particle composition including ink, paint, adhesives, solvents, toner particles, shot blast pellets, etc. for pattern transfer utilized in decoration, printing, cleaning, bonding, or embossing. Over-all decorative coatings with paints or inks can thus be applied and sufficient discrimination can be achieved for descriptive information such as instructions, names, symbols, trademarks, etc. that one may wish to apply to any substrate.

It should be understood that in the following claims "substrate" refers to either a fixed or a moving material or item. By simple vector velocity analysis it may be shown that inclining the apparatus at a small angle with respect to the substrate will allow "matching" of the velocity of the deposited material with that of the substrate. Such inclination is a part of our invention.

Thus, the present invention may be embodied in other specific forms without departing from the spirit and the essential characteristics of the invention. The present embodiment is therefore to be considered in all respects as illustrative and the scope of the invention being indicated by the appended claims rather than the foregoing description, and all changes which come within the meaning and range of the equivalency of the claims are therefore intended to be embraced therein.

What is claimed is:

1. An electrohydraulic transfer device comprising means defining a chamber and having an open portion, flexible means positioned about the open portion for enclosing the chamber, electrical discharge means positioned within said means defining a chamber, means for depositing material on said flexible means, and means for causing a discharge by said electrical discharge means to actuate said flexible means and thereby remove the material therefrom.

2. An electrohydraulic transfer device comprising means defining a chamber and having an open portion, a diaphragm positioned about the open portion for enclosing a fluid within said means defining a chamber, electrical discharge means positioned within said means defining a chamber, means for depositing material on said diaphragm, and means for causing a discharge by said electrical discharge means to transfer the energy created thereby through the fluid to said diaphragm for removing the material therefrom.

3. Apparatus for transferring a pattern to a substrate comprising means defining a chamber and having an open portion, flexible means positioned about the open portion for enclosing the chamber, electrical discharge means positioned within said means defining a chamber, means for applying to said flexible means the pattern to be transferred, means positioned juxtaposed said flexible means for supporting a substrate, and means for causing a discharge by said electrical discharge means to actuate said flexible means and thereby transfer the pattern to the substrate.

4. Apparatus for transferring a patten to a substrate comprising means defining an acoustical chamber and having an open portion, a flexible diaphragm positioned about and secured to the open portion for enclosing the chamber, said chamber and flexible diaphragm supporting a liquid, electrical discharge means positioned within said means defining a chamber, means for applying to said flexible diaphragm the pattern to be transferred, means positioned juxtaposed said flexible diaphragm for supporting a substrate, and means for causing a discharge by said electrical discharge means to actuate said flexible means through said fluid and thereby transfer the pattern to the substrate.

5. Apparatus for transferring a pattern to a substrate comprising means defining a fluid-filled acoustical chamber and having an open portion, a flexible diaphragm positioned about the open portion for enclosing the chamber, a pair of electrodes supported in spatial relationship and defining a gap therebetween within said means defining a chamber, means for applying to said flexible diaphragm the pattern to be transferred, means positioned juxtaposed said flexible means for supporting a substrate, and means for applying a potential across said electrodes to produce a discharge in said gap within said chamber and thereby actuate said flexible diaphragm through said fluid to transfer the pattern to the substrate.

6. The apparatus as defined in claim 5 including means for varying the spatial relationship of said electrodes.

7. Apparatus for transferring a pattern to a substrate comprising means defining an acoustical fluid-filled chamber and having an open portion, flexible means positioned about the open portion for enclosing the chamber, electrical discharge means positioned within said means defining a chamber, means for applying to said flexible means the pattern to be transferred, means positioned juxtaposed said flexible means for supporting a substrate, means for advancing a substrate between said flexible means of said chamber and said means positioned juxtaposed said flexible means, and means for causing a discharge by said electrical discharge means to actuate said flexible means through said fluid and thereby transfer the pattern to the substrate.

8. An electrohydraulic transfer device comprising a fluid-filled chamber having an open portion formed longitudinally from a throat, flexible means positioned about the open portion for enclosing the chamber, electrical discharge means positioned within said means defining a chamber, means for depositing material on said flexible means, and means for causing a discharge by said electrical discharge means to actuate said flexible means and thereby remove the material therefrom.

9. The device as defined in claim 8 wherein said fluid-filled chamber is in the form of a conical reflector.

10. The device as defined in claim 8 wherein said fluid-filled chamber is in the form of a cylindrical reflector.

11. The device as defined in claim 8 wherein said fluid-filled chamber is in the form of an exponential reflector.

12. The combination as defined in claim 8 wherein said fluid-filled chamber is in the form of a parabolic reflector.

13. The device as defined in claim 8 wherein said fluid-filled chamber is in the form of a hyperbolic reflector.

14. Apparatus for transferring a pattern to a substrate comprising means defining a chamber and having an open portion, flexible means positioned about the open portion for enclosing the chamber, electrical discharge means positioned within said means defining a chamber, means for applying to said flexible means the pattern to be transferred, means positioned juxtaposed to said flexible means for supporting a substrate, means for causing a discharge by said electrical discharge means to actuate said flexible means and thereby transfer the pattern to the substrate, and means positioned adjacent said flexible means for detecting the presence of a substrate and thereby actuating said means for causing a discharge.

15. The apparatus as defined in claim 14 wherein said means for detecting the presence of a substrate is a photoelectric circuit.

16. Apparatus for transferring a pattern to a substrate comprising means defining an acoustical fluid-filled chamber and having an open portion, a flexible diaphragm positioned about the open portion for enclosing the chamber, electrical discharge means positioned within said means defining a chamber, means for applying to said flexible means the pattern to be transferred, means positioned adjacent said flexible diaphragm for supporting a substrate, means for advancing a substrate between said flexible diaphragm of said chamber and said means positioned adjacent said flexible diaphragm, means for sensing the presence of a substrate adjacent said flexible diaphragm, and means under control of said means for sensing for causing a discharge by said electrical discharge means to actuate said flexible diaphragm through said fluid and thereby transfer the pattern to the substrate.

17. An electrohydraulic transfer device comprising means defining a chamber and having an open portion, flexible means positioned about the open portion for enclosing the chamber, a plurality of electrical discharge means positioned within said means defining a chamber, means for depositing material on said flexible means, and means for causing a discharge of said plurality of electrical discharge means to actuate said flexible means and thereby remove the material therefrom.

18. Apparatus for transferring a pattern to a substrate comprising means defining a fluid-filled acoustical chamber and having an open portion, a flexible diaphragm positioned about the open portion for enclosing the chamber, a plurality of pairs of electrodes supported in spatial relationship within said means defining a chamber, means for applying to said flexible diaphragm the pattern to be transferred, means positioned juxtaposed said flexible means for supporting a substrate, and means for simultaneously applying a potential to each of said pairs of electrodes for producing a discharge to thereby actuate said flexible diaphragm through said fluid to transfer the pattern to the substrate.

19. Apparatus for transferring a pattern to a substrate comprising means defining an acoustical fluid-filled chamber and having an open portion, flexible means positioned about the open portion for enclosing the chamber, a plurality of electrical discharge means positioned within said means defining a chamber, means for applying to said flexible means the pattern to be transferred, means positioned juxtaposed said flexible means for supporting a substrate, means for advancing a substrate between said flexible means of said chamber and said means positioned juxtaposed said flexible means, a plurality of gates coupled to said electrical discharge means, a gate per discharge means, a power supply coupled between each of said electrical discharge means and said gates, and means coupled to each of said gates for causing said power supply to provide an electrical discharge at each of said electrical discharge means to actuate said flexible means through said fluid and thereby transfer the pattern to the substrate.

20. The apparatus as defined in claim 19 wherein said means coupled to each of said gates is a time pulse generator.

21. The apparatus as defined in claim 19 wherein said means coupled to each of said gates includes means for sequentially causing a discharge by said electrical discharge means.

22. The apparatus as defined in claim 19 wherein said means coupled to each of said gates includes means for selectively causing a discharge between certain of said electrical discharge means.

23. The combination as defined in claim 19 wherein each of said electrical discharge means is a pair of electrodes positioned in spatial relationship.

24. The method of removing a pattern at high velocity comprising the steps of applying a pattern to a flexible diaphragm, and removing the pattern by the abrupt change in direction of the diaphragm after actuation by an electrical discharge.

25. The method of transferring a pattern from a surface to a second surface comprising the steps of applying a pattern to a flexible diaphragm, positioning a substrate adjacent the diaphragm and transferring the pattern on the diaphragm to the substrate by the abrupt change in direction of the diaphragm after the diaphragm is accelerated in a first direction and without fully contacting the substrate with the diaphragm.

26. The method of claim 25 wherein the step of transferring the pattern by actuation of the diaphragm is by an electrical discharge.

27. The method of removing a pattern at high velocity comprising the steps of enclosing a fluid in a chamber, stretching a flexible diaphragm over an open portion of the chamber, submerging a pair of electrodes in the chamber, applying a pattern to the diaphragm, and actuating the diaphragm by causing an electrical discharge across the electrodes to quickly remove the pattern.

28. The method of printing on an uneven surface comprising the steps of enclosing a fluid in a reflector having an open end, placing a flexible diaphragm over the open end, applying printing material to the diaphragm, submerging a pair of electrodes in the chamber and transferring the printing material to a surface by actuating the diaphragm by causing an electrical discharge across the electrodes.

29. The method of transferring a pattern to an uneven surface comprising the steps of enclosing a fluid in a chamber having an open end, securing a flexible diaphragm over the open end, applying a pattern to the diaphragm, submerging a plurality of electrode pairs within the chamber opposite the diaphragm, positioning a pattern receiving surface adjacent the diaphragm and causing an electrical discharge across the electrode pairs to actuate the diaphragm and thereby transfer the pattern to the surface.

30. The method of claim 29 wherein the step of causing an electrical discharge across the electrode pairs is performed simultaneously in time.

31. The method of claim 29 wherein the step of causing an electrical discharge across the electrodes is sequential, electrode pair to electrode pair.

32. The method of claim 29 wherein the step of causing an electrical discharge is by applying energy to random ones of the pairs of electrodes.

References Cited

UNITED STATES PATENTS

| | | | |
|---|---|---|---|
| 3,180,256 | 4/1965 | Kramer et al. | 118—205 X |
| 2,811,101 | 9/1957 | Devol. | |
| 2,202,464 | 5/1940 | Pattison | 101—426 |
| 2,077,790 | 4/1937 | Hakogi | 101—426 X |

ALFRED L. LEAVITT, *Primary Examiner.*

A. M. GRIMALDI, *Assistant Examiner.*